Figure 1:
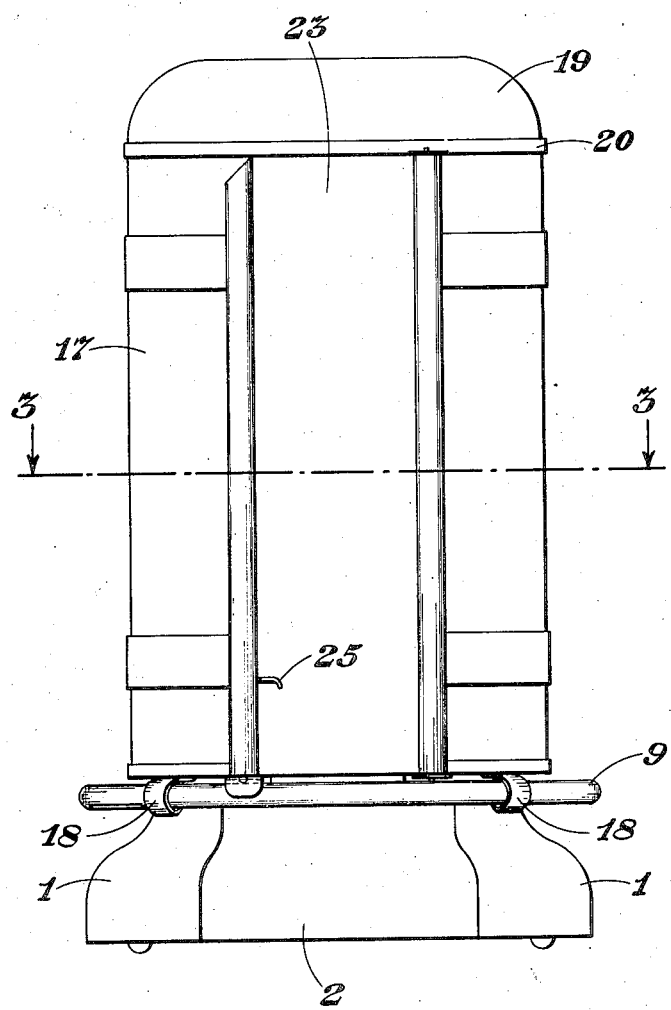

Oct. 6, 1936.  O. J. MOEHLER  2,056,614
ULTRAVIOLET STERILIZER
Filed June 13, 1933  4 Sheets-Sheet 1

INVENTOR
Otto J. Moehler
BY
Thos H Brown
ATTORNEY

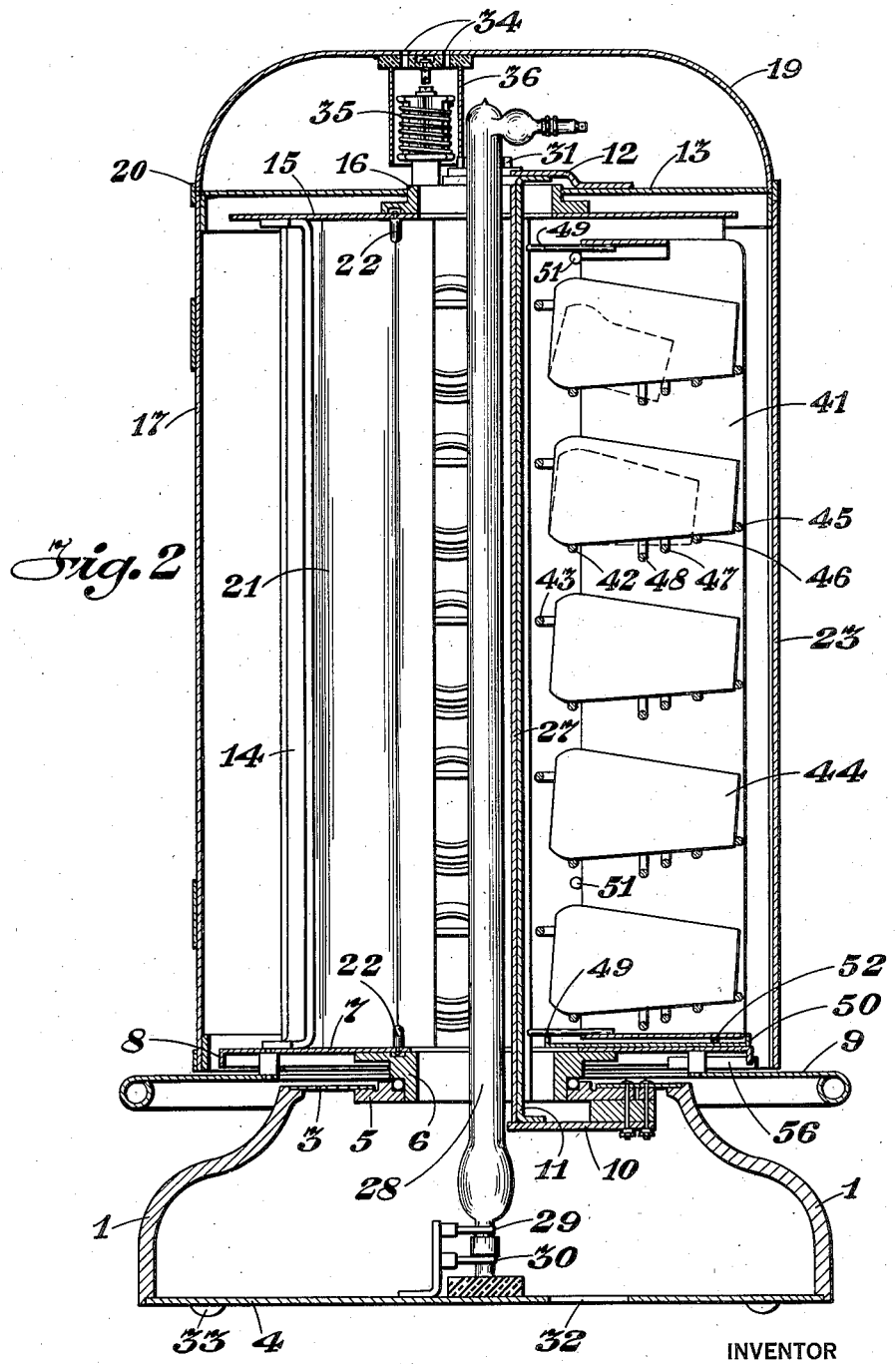

Oct. 6, 1936.                O. J. MOEHLER                2,056,614
                          ULTRAVIOLET STERILIZER
                         Filed June 13, 1933        4 Sheets-Sheet 3
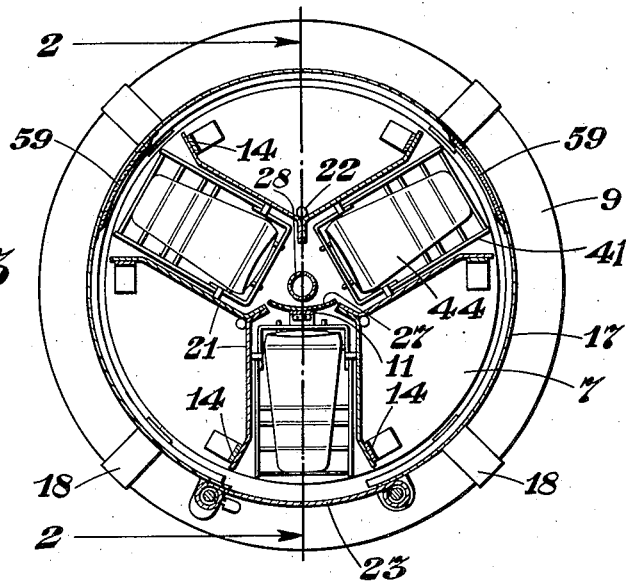
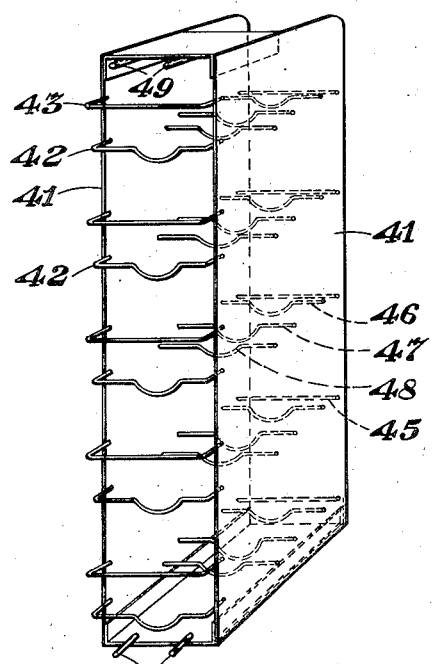
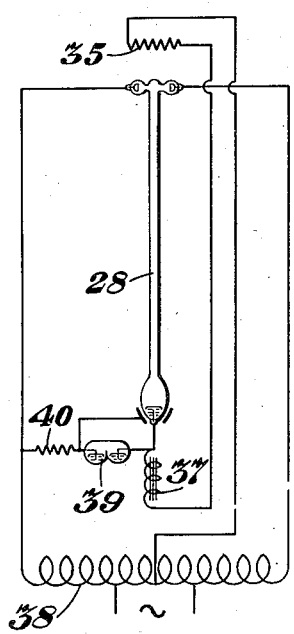

Oct. 6, 1936.   O. J. MOEHLER   2,056,614
ULTRAVIOLET STERILIZER
Filed June 13, 1933   4 Sheets-Sheet 4

INVENTOR
Otto J. Moehler
BY
Thos H. Brown
ATTORNEY

Patented Oct. 6, 1936

2,056,614

UNITED STATES PATENT OFFICE 2,056,614

ULTRAVIOLET STERILIZER

Otto J. Moehler, Newark, N. J., assignor to General Electric Vapor Lamp Company, Hoboken, N. J., a corporation of New Jersey Application June 13, 1933, Serial No. 675,617

7 Claims. (Cl. 21—18)

The present invention relates to the art of irradiation generally, and in particular to the sterilization of articles by ultraviolet radiation.

A particular object of the invention is to provide a novel apparatus for irradiating objects, such as drinking glasses and the like, with ultraviolet radiations. Another object of the invention is to provide an apparatus which will permit insertion and removal of the objects to be sterilized without escape of any of the ultraviolet radiations. Another object of the invention is to provide apparatus which prevents the handling of the irradiated glasses or the like except by the bottom thereof. Still other objects and advantages of the invention will appear from the following detailed specification or from an inspection of the accompanying drawings.

The invention consists in the new and novel apparatus hereinafter set forth and claimed.

It has recently been discovered that drinking glasses and the like can be sterilized more effectively by ultraviolet radiations than by any other convenient means. In providing apparatus to irradiate these glasses it has been found desirable, however, to positively preclude the escape of ultraviolet radiations from the apparatus at all times, especially when the apparatus is to be used in public places, such as at soda fountains and the like. It is also desirable to provide means in such an apparatus to support the glasses or the like in such fashion that the attendant cannot conveniently handle said glasses, after sterilization, except by the bottom thereof. I have now devised a novel irradiating apparatus which produces these results. This apparatus, which is extremely simple to operate, consists essentially of a housing within which there is a suitable source of ultraviolet light. A rotatable member within said housing is adapted to retain a novel rack of my invention. In one position of said rotatable member this rack is adjacent to an opening in the outer housing, and in this position said rotatable member cooperates with said housing to prevent the escape of ultraviolet radiations from said source through said opening. A closure is provided for said opening, said closure being interlocked with said rotatable member in such fashion that said closure cannot be opened save when said rotatable member is in the foregoing position, and so that said rotatable member cannot be rotated save when said closure closes said opening. Thus the escape of radiations during loading and unloading is positively precluded. Suitable ventilation is of course necessary, and this is provided according to my invention in such fashion as to prevent the escape of ultraviolet radiations. In the preferred form of my apparatus I use a vertical tubular source of ultraviolet radiations, and the glasses and the like are supported with their open mouths facing said source in a rack in which they must be inserted mouth first. Thus this novel rack virtually prevents handling of the sterilized glasses save by the bottom thereof.

Figure 6:
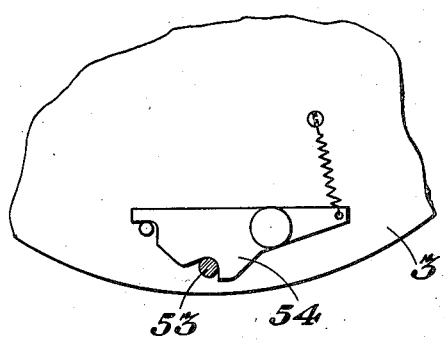
Figure 7:
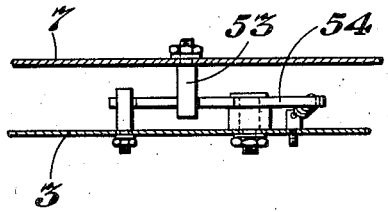
Figure 8:
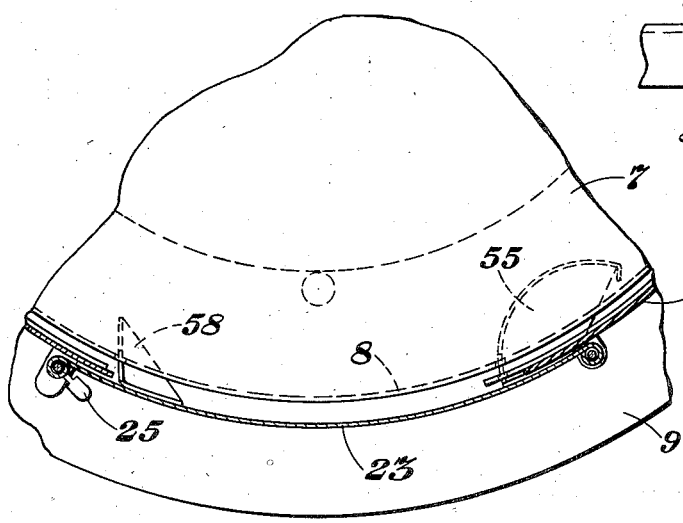
Figure 9:
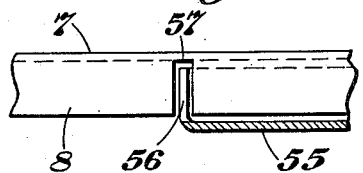
Figure 10:
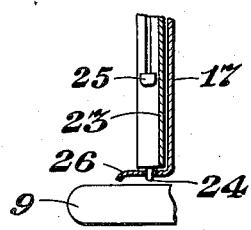

For the purpose of illustrating my invention I have shown a preferred embodiment thereof in the accompanying drawings in which Fig. 1 is an elevation of an apparatus especially designed for sterilizing drinking glasses, Fig. 2 is a vertical sectional view of the same apparatus, taken from the side, as shown in Fig. 3, Fig. 3 is a sectional view taken on the line 3—3 of Fig. 1, Fig. 4 is a perspective view of the novel rack used to support the glasses, Fig. 5 is a schematic diagram of the electrical circuit which is preferably employed, Figs. 6 and 7 are fragmentary views showing in plan and sectional elevation, respectively, the mechanism which is employed to accurately position the rotating member, Figs. 8 and 9 are fragmentary views showing in plan and elevation, respectively, the interlocking mechanism employed between the closure and the rotating members, and Fig. 10 is a view of the closure latching means.

As shown in these drawings my novel sterilizing apparatus has a substantially rectangular base consisting of the cast end members 1 which are connected together by the sheet metal side plates 2, a top plate 3 and a bottom plate 4. The plate 3 has a centrally disposed opening of considerable area therein, to the rim of which the annular bearing member 5 is attached. A cooperating annular bearing member 6 rests on said member 5 and has a downwardly extending portion which fits into the central opening in the latter member in order to prevent lateral displacement, a series of balls being preferably enclosed in a raceway between said members 5 and 6. Said bearing member 6 carries a circular plate 7 which likewise has a central opening therein. Said plate has a downturned rim 8 whose locking function will be described hereinafter. An annular member of sheet metal having the outer rim rolled over to form a handwheel 9 is carried by the plate 7 on the under side thereof. A bracket 10 which is suspended from the plate 3 extends inwardly toward the center of the opening in said plate, and near its inner end supports an upwardly extending bar 11. At its upper end said bar carries a bracket 12 to which is affixed a circular plate 13 which has a large circular opening centrally disposed therein. A plurality of upwardly extending bars 14 are likewise carried by the rotatable plate 7, said bars carrying at their upper end a circular plate 15. Said plate 15 has a large central opening therein to the rim of which is affixed a flanged collar 16. Said collar 16 fits into the aforesaid central opening in the plate 13 and thus serves to prevent any lateral displacement of the upper end of the rotatable assembly which is carried by the bearing member 6. A cylindrical housing 17 of sheet metal is carried at its upper end by the fixed plate 13, while the lower end thereof is supported by a plurality of brackets 18 which extend outwardly around the rim of the handwheel 9 and which are attached to the plate 3. A removable domed cover 19 rests on the plate 13, and the joint between said cover and the housing 17 is made substantially light tight by the band 20 which girdles said housing and extends over said joint. Each of the bars 14 has a partition 21 of sheet metal attached thereto, said partition extending from the plate 7 upwardly to the plate 15. Said partitions are arranged in pairs which are parallel throughout the major portion thereof, but the inner edges of these partitions are bent from the point where adjacent partitions converge to extend toward the axis of said plates 7 and 15 while the outer edges are likewise bent to extend radially for a short distance. A pair of pins 22, one in the plate 15 and one in the plate 7, are preferably placed at the junction of said partitions to fix the position of said junction. An opening is provided in the housing 17 at a point directly opposite the bar 11, said opening extending from the top to the bottom of said housing and having a width which is slightly less than the distance between the outer edges of any pair of said partitions 21. A door 23 which is hinged to said housing 17 at one edge of said opening is of such a size and shape as to make a light tight closure therefor. A suitable latching means, such as the slidable bolt 24 which is operated by the handle 25, and which engages a hole in the outwardly extending tab 26 on said housing 17, as shown in Fig. 10, is provided to keep said door closed. A cylindrical reflector 27 which is attached to the support bar 11 extends slightly beyond the inturned edges of a pair of the partitions 21 when said partitions are symmetrically positioned opposite the door 23, and is located as close to said partitions as is consistent with the rotation of said partitions past the edges of said reflector, so as to make a substantially light tight joint therewith.

A mercury vapor arc tube 28 of the Cooper-Hewitt type and formed of fused silica or other ultraviolet transmitting material extends axially through the central openings in the plates 3, 7, 13 and 15, the lower end thereof being supported by the bottom plate 4. Spring clips 29 and 30 make contact with the leads to the starting band and the cathode, respectively, and at the same time maintain the axial alignment of the lower end of said tube. A spring clamp 31 which is mounted on the bracket 12 grips the upper end of said arc tube and thus maintains it in the desired position. In order to provide the necessary ventilation for said arc tube an air inlet opening 32 is provided in the bottom plate 4 and said plate is mounted on the feet 33, while a plurality of air outlet openings 34 are provided in the cover 19. The ballast resistance 35 is mounted on the plate 13 directly under said openings 34, and a cylindrical shell 36 which is carried by the cover 19 extends downwardly about said resistance and quite close thereto, causing all of the ventilating air to pass over the turns of said resistance before it escapes through said openings 34. The air is thus heated to a temperature which is sufficient to decompose any ozone which may have been formed by the ultraviolet radiations, as disclosed in an application of Leroy J. Buttolph Serial Number 675,618, filed June 13, 1933.

The connection of the ballast 35 and of the lamp 28 have been omitted in Fig. 2 in the interest of clearness, but are clearly shown in Fig. 5. As there shown the cathode of the arc tube 28 is connected through the usual inductance 37 and the ballast resistance 35 to the midpoint of the auto-transformer 38, while the ends of said auto-transformer are connected directly to the anodes of said arc tube. The shifter 39 is connected in the usual manner in series with a resistance 40 between the cathode and an anode lead, with the usual starting band connection to one side of the shifter. Said auto-transformer 38 is connected to a source of alternating current in the usual manner. The inductance 37, auto-transformer 38, shifter 39 and resistance 40 are all conveniently located within the base of my apparatus, and the anode leads and the leads to the ballast resistance 35 are conveniently located behind the reflector 27 where they will not interfere in any way with the irradiation process.

A plurality of racks such as shown in detail in Fig. 4 are provided to support the glasses or the like in the desired position with respect to the arc tube 28. These racks each have a pair of sheet metal sides 41 which are spaced apart in any suitable manner by a distance which is slightly less than the distance between the pairs of partitions 21 so that said rack can be inserted between said partitions. The height of said sides is likewise slightly less than the distance between the plates 7 and 15, and the width thereof is considerably less than the distance between the reflector 27 and the outer rim of the plate 7. A series of rigid wires 42 which are welded or soldered to said side plates 41 extend forwardly therefrom and then across the space therebetween, and preferably have a downward curvature near the middle thereof to center a glass that is supported thereon. Said wires 42 are spaced apart a distance somewhat greater than the maximum diameter of the largest glass which it is intended to support therein. A second series of wires 43 is likewise affixed to the plates 41, one somewhat above each of the wires 42. Each of these wires 43 extends outwardly a little further than the wires 42 before crossing to the other plate 41, each of said wires thus serving as a stop for a glass 44 which is placed in said rack. The relative spacing of said wires 42 and 43 is such that it is impossible for a glass to pass therebetween at any point. A third series of wires 45 extends straight across from one plate 41 to the other near the back edge thereof, each wire of this series being slightly above the corresponding wire 42 and spaced therefrom by a distance slightly greater than the height of the largest glass to be sterilized. These wires serve as retaining means for glasses of this size. Another series of wires 46 extends from plate to plate, each wire of the series having a downward curve therein near the center thereof to center a glass supported thereon. These wires are each located slightly below the level of the corresponding wire 45 and are spaced from the wires 43 by a distance which is slightly greater than the height of the next smaller size glass which is to be sterilized. Thus each of the wires 46 is adapted either to support the back end of the largest size glass, or to serve as retaining means for the next small size glass. Another similar series of wires 47 is similarly spaced for a still smaller sized glass, while still another similar series of wires 48 which are placed below the level of the wires 47 and somewhat nearer to the wires 42 serve as a support for the rear end of the smallest sized glasses. The position of the largest glasses is indicated in Fig. 2 in full lines, while the position of the two smaller glasses is suggested by the dash lines in this figure. With this construction glasses of several sizes may be sterilized, and in each case the mouth of the glass 44 will be at substantially the same distance from the arc tube 28, and will thus be adequately sterilized in the usual short irradiation interval. A plurality of pins 49 are provided at the top and bottom of said rack, said pins extending out farther than the cross wires 43, whereby said rack can be supported by said pins on a counter without any of the glasses 44 therein coming into contact with said counter.

A tray 50 is provided between each pair of partitions 21 to catch any dripping water in case freshly washed glasses 44 happen to be placed in the sterilizer. Pins 51 in said partitions serve as stops for the sides 41 of the previously described rack, which just fits into said tray 50 when against said pins. A cross rod 52 located on the bottom of said tray at a point near the outer edge thereof supports said rack and tends to give it a slight inward tilt.

In order to accurately position the partitions 21 opposite the door 23, so that the rack may be unloaded and loaded without the escape of ultraviolet radiations past the reflector 27, a pin 53 is affixed to the lower side of the plate 7 near each pair of partitions 21, as shown in Figs. 6 and 7. These pins engage a spring dog 54 which is mounted on the plate 3. Said dog is so shaped as to permit the passage of each pin 53 thereby in a clockwise direction, but to prevent the passage of said pins thereby in the opposite direction.

The interlocking means employed to positively prevent escape of ultraviolet radiations through faulty operation of the door 23 is shown in Figs. 8 and 9. As there shown the door 23 has a horizontal plate 55 attached to the bottom thereof at the hinge side. Said plate has an upturned rim 56 which describes an arc about the door hinge and which is adapted to register with a slot 57 in the downturned rim 8 on the plate 7 when any pair of the partitions 21 on said plate 7 is exactly at the loading position. Said rim 56 terminates at a point which just clears the inner side of the rim 8 when said door 23 is fully closed, and thus allows free movement of the plate 7 so long as said door is closed. Said door cannot be opened, however, unless the slot 57 is in a position to register with the rim 56; nor can said plate 7 be moved so long as said door is open, due to the obstruction offered by the rim 56 in said slot 57. A second horizontal plate 58 is affixed to said door 23 at the corner away from the hinge, this plate likewise having an upwardly extending rim which engages in a similar manner with a similar slot in the rim 8. Said plate 58, due to its greater distance from the door hinge, exercises a more accurate control over the operation of the door 23 than does the plate 55, and is used to supplement the action of the latter plate when said door is just opening or closing. The use of this second plate is, of course, a refinement which may be omitted, if desired, although if it is omitted the slot 57 must be made to more closely fit the rim 8.

A window 59, which may be of glass, transparent bakelite, or the like, is placed in the wall of the housing 17 opposite each sterilizing position. These windows prevent the escape of ultraviolet radiations but afford a view of the glasses being sterilized and form a striking addition to the sterilizing apparatus.

In the use and operation of this sterilizing apparatus the mercury vapor lamp 28 is started in the usual manner and the handwheel 9 revolved in a clockwise direction, as viewed from above, until the dog 54 just snaps over a pin 53, after which said handwheel is moved in the reverse direction until said pin is moved firmly against said dog. The slot 57 in the rim 8 is then opposite the rim 56, and another slot in the rim 8 is directly opposite the rim of the plate 58, so that the door 23 may be opened. The plate 7 is then locked against rotation, as soon as said door starts to open. Escape of ultraviolet radiations through the open door is prevented, of course, due to the cooperation of the partitions 21 with the reflector 27 to form a substantially light tight barrier. A series of glasses 44 may be loaded directly into the exposed rack, if desired, but in most cases it is preferable to remove the rack and place it on the pins 49. The glasses 44 are then placed mouth down upon the wires 43. The rack is then reinserted between the partitions 21 and against the pins 51, each glass 44, regardless of size, then automatically coming to rest on the proper support wires. Due to the angle at which the glasses are supported the handling of the rack during this process causes said glasses to move backward slightly from said wires 43, and the final dropping of said rack into the tray 50 as it slides over the edge thereof greatly facilitates this movement. Such a movement of the glasses is, of course, desirable since it assures the complete irradiation of the mouth of each glass 44 without any possibility of a shadow due to the wires 43. As a result it is unnecessary to use a material, such as fused silica, which is transparent to ultraviolet radiations for the wires 43. The door 23 is then closed and latched whereupon the plate 7 is again unlocked. The handwheel 9 is then rotated in a clockwise direction until the dog 54 snaps past the next pin 53. The motion of the handwheel is then reversed to bring said pin firmly against the dog. The door 23 is then again opened and the next rack loaded in the same manner as the previous one. The door 23 is then closed and the handwheel 9 again rotated as before to bring the next rack opposite to said door, whereupon that rack is loaded in a like manner. During these loading operations the glasses 44 in the first rack loaded are being continuously irradiated by radiations from the lamp 28, and are thus being sterilized. As the handwheel is again moved, however, these glasses pass behind the reflector 27 to the position opposite the door 23. Said door is then opened and the rack removed and placed on the counter; or if desired the glasses may be taken out without removal of the rack. In either case it is obvious that the glasses 44 must be handled, due to their position in said rack, by the bottom thereof, so that there is no chance of the lip of the glasses becoming contaminated by careless handling during removal. As a refinement, extra racks may be provided which may be loaded as desired, and substituted each time for the rack which is removed, the sterilized glasses remaining in the rack pending use. It has been found that the sterilization proceeds at such a rapid rate, ordinarily requiring less than 15 seconds, that it is unnecessary to provide any delay between operations, complete sterilization being obtained even when the successive racks are loaded and unloaded as rapidly as possible. At each successive movement of the handwheel 9 a fresh rack of sterilized glasses is brought to the door 23, these glasses being removed and replaced as previously described.

During the operation of the sterilizing device considerable ozone is formed therein due to the irradiation of the air therein. This ozone, which is frequently objectionable, is heated to a temperature which is sufficient to provide decomposition thereof as it passes over the coils of the resistance 35, which are being operated at a temperature of the order of 500° C. This heating is attained without any increase in energy consumption due to the novel use of the ballast resistance which is invariably provided to stabilize the mercury arc. This resistance is placed in the negative lead of the arc lamp, rather than distributed between the anode leads, as is more usual, in order to concentrate the heating and produce a higher temperature in the coils thereof.

While I have described my invention by reference to a specific embodiment thereof it is to be understood that various changes, omissions and substitutions, within the scope of the appended claims, may be made therein without departing from the spirit thereof.

I claim as my invention:—

1. In apparatus for sterilizing with ultra violet radiations, in combination, a housing, a rotatable member within said housing, a source of ultraviolet radiations within said housing, dividing partitions on said rotatable member, a light baffle within said housing adapted to cooperate with different pairs of said partitions to shut off the space therebetween from radiations from said source, an opening in said housing in registry with the space between any pair of said partitions which are thus cooperating with said baffle, and a closure for said opening.

2. In apparatus for sterilizing with ultraviolet radiations, in combination, a housing, a rotatable member within said housing, a tubular source of ultraviolet radiations positioned on the axis of said rotatable member, dividing partitions on said rotatable member, a fixed reflector within said housing adapted to cooperate with different pairs of said partitions to shut off the space therebetween from radiations from said source, an opening in said housing in registry with the space between any pair of partitions which are thus cooperating with said reflector, a closure for said opening, and means to interlock said closure with said rotatable member, whereby said closure must be in the closed position whenever said rotatable member is in any position other than with a pair of said partitions in registry with said baffle.

3. In apparatus for sterilizing with ultraviolet radiations, in combination, a housing, a rotatable member within said housing, a tubular source of ultraviolet radiations positioned on the axis of said rotatable member, dividing partitions on said rotatable member, a fixed reflector within said housing adapted to cooperate with different pairs of said partitions to shut off the space therebetween from radiations from said source, an opening in said housing in registry with the space between any pair of partitions which are thus cooperating with said reflector, a closure for said opening, and means to retain a plurality of open mouth vessels between different pairs of said partitions with the open mouths thereof in proximity to said source.

4. In apparatus for sterilizing with ultraviolet radiations, in combination, a housing, a rotatable member within said housing, a tubular source of ultraviolet radiations positioned on the axis of said rotatable member, dividing partitions on said rotatable member, a fixed reflector within said housing adapted to cooperate with different pairs of said partitions to shut off the space therebetween from radiations from said source, an opening in said housing in registry with the space between any pair of partitions which are thus cooperating with said reflector, a closure for said opening, and a removable rack between each pair of said partitions, each of said racks being adapted to retain open mouth vessels with the open end thereof in proximity to said source.

5. In apparatus for sterilizing with ultraviolet radiations, in combination, a housing, a rotatable member within said housing, a tubular source of ultraviolet radiations positioned on the axis of said rotatable member, dividing partitions on said rotatable member, a fixed reflector within said housing adapted to cooperate with different pairs of said partitions to shut off the space therebetween from radiations from said source, an opening in said housing in registry with the space between any pair of partitions which are thus cooperating with said reflector, a closure for said opening, and means to insure rotation of said member in a single direction.

6. In apparatus for sterilizing drinking glasses with ultraviolet radiations, a rack comprising a pair of spaced side members, means extending between said members to support a plurality of glasses on their sides, means to retain said glasses on said supports comprising transverse members adapted to engage each end of said glasses, the member adapted to engage the mouth of each glass consisting of a wire extending between the edges of said members which is so spaced with respect to the supports for adjacent glasses that a glass cannot pass therebetween, and pins extending from the same edges of said side members to support said rack, said pins being long enough to prevent a glass supported on said wire making contact with a plane surface.

7. In apparatus for sterilizing drinking glasses with ultraviolet radiations, a rack comprising a pair of spaced side members, a transverse member extending therebetween and adapted to support the side of a glass near its mouth, a transverse wire between said members adapted to engage the mouth of a glass on said support, a transverse member spaced from said wire by a distance which is slightly greater than the height of the tallest glass to be held, a transverse member lower in height than said last mentioned member and at such a distance from said wire that it is adapted to support the side of a shorter glass near the bottom thereof, and another transverse member between the two last mentioned members having a height intermediate thereof, said last mentioned member being so positioned with respect to said wire that it can serve either to retain the end of said shorter glass or support the side of said tallest glass.

OTTO J. MOEHLER.